UNITED STATES PATENT OFFICE.

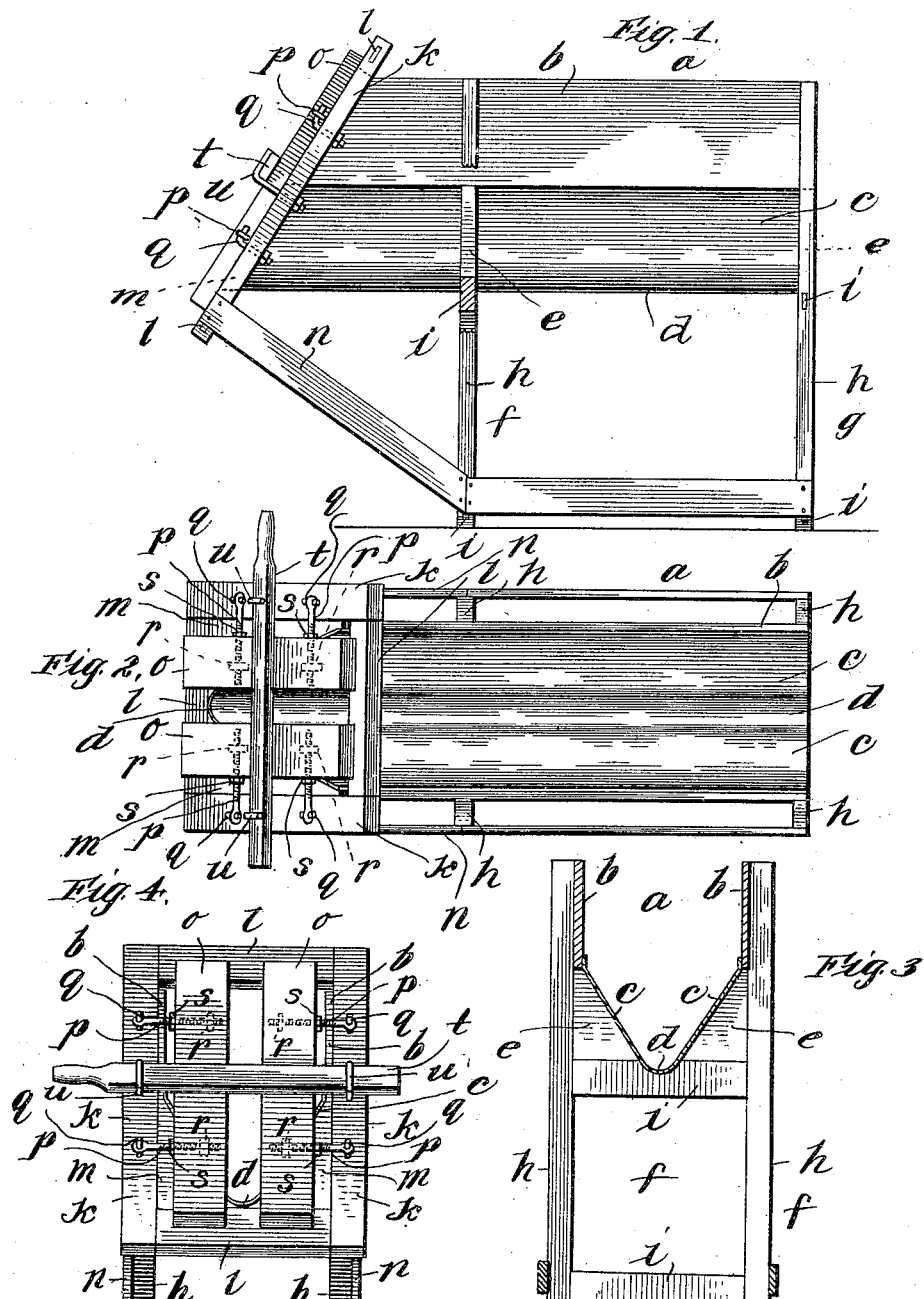

THOMAS L. CARDWELL, OF NEW FLORENCE, MISSOURI.

ANIMAL-HOLDER.

No. 922,667.  Specification of Letters Patent.  Patented May 25, 1909.

Application filed February 17, 1908. Serial No. 416,228.

*To all whom it may concern:*

Be it known that I, THOMAS L. CARDWELL, citizen of the United States, residing at New Florence, in the county of Montgomery and State of Missouri, have invented a certain new and useful Improvement in Animal-Holders, of which the following is a full, clear, concise, and exact description, reference being had to the accompanying drawings, forming a part of this specification.

My invention relates to animal holding apparatus, and has for its object generally the construction of an improved animal holding apparatus whereby animals may be held in position for the purpose of operating upon them.

By means of my invention, I am enabled to make an animal holding device which is simple in construction and operation.

In practicing my invention, I employ a trough and so mount the same that the animal within the trough may by its weight tilt the trough and hold the trough in its tilted position. The trough initially does not occupy its tilted position but does occupy a position that will enable an animal readily to enter the same, the animal in its progress ultimately reaching a point of the trough that will cause the trough to tilt to its slanting or inclined position. The end of the trough that receives the animal need not be provided with any gate or obstruction to bar the egress of the animal, as the animal is not capable of climbing upwardly or walking backward, when the trough is tilted, particularly if the trough be provided with converging bottom walls faced with some smooth material, as galvanized iron. While the rear or animal-receiving end of the trough is desirably unprovided with any gates or doors, the forward end of the trough is desirably provided with a pair of movable doors which are adjustable upon their mountings so that the extent to which the doors may approach when closed, may be varied. I prefer outwardly swinging doors and a bar for holding the same in their closed position, so that the nose or head of the animal may project through the space between the doors while the body of the animal will be held from passing through the space.

The apparatus of my invention has been designed primarily for the purpose of treating hogs, as it enables the hogs readily to be held for the purpose of placing rings in their noses which may project between the doors, as stated, and also for the purpose of castrating the male hogs and spaying the female hogs.

I will explain my invention more fully by reference to the accompanying drawing, showing the preferred embodiment thereof, in which—

Figure 1 is a view in elevation of my improved apparatus in its normal untilted position. Fig. 2 is a plan view of the structure shown in Fig. 1. Fig. 3 is a view of the rear end of the apparatus—that end initially receiving the animal. Fig. 4 is a front view of my improved apparatus.

Like parts are indicated by similar characters of reference throughout the different figures.

The trough proper $a$ may be made of suitable shape, that illustrated being preferred, the trough in its formation desirably including parallel vertical wall portions $b$ $b$, preferably formed of planks, the converging wall portions $c$ $c$ continuing downwardly from the wall portions $b$ $b$ and converging toward each other, the wall portions $c$ $c$ desirably being formed of some smooth material, such as galvanized sheet iron, in which event the two wall portions $c$ $c$ may be made of one integral piece of metal, the curved bottom wall portion $d$ being then an integral continuation of the wall portions $c$ $c$. Where sheet metal is employed for the wall portions $c$ $c$, $d$, supporting blocks $e$ $e$ are desirably employed for the purpose of maintaining the shape of the sloping bottom $c$ $c$ of the trough. There are two frame structures $f$ and $g$ which are substantially alike, one of which being illustrated in Fig. 3, where the frame structure $g$ is shown as comprising two uprights $h$ $h$ and two struts $i$ $i$ interposed between the uprights, the upper strut $i$ carrying the supporting blocks $e$ $e$ and engaging the bottom portion $d$ of the galvanized iron portion of the trough. The vertical sides $b$ $b$ of the trough are secured to the upper portions of the uprights $h$, as indicated. Both of the frame structures $f$ and $g$ are, as stated, substantially alike, and each supports blocks similar to the blocks $e$ $e$ and the portion $d$ of the trough, and the parts shown in Fig. 1 which are similar to parts shown in Fig. 3 are given similar characters of reference. The forward end of the trough is inclosed by a rectangular frame including upright portions $k$ $k$ united by horizontal struts $l$ $l$, the lower strut $l$ supporting the blocks $m$ $m$ similar in construction and function to the blocks $l$ $l$ and the forward portion $d$ of the galvanized sheet iron bottom of the trough. The vertical side walls $b$ $b$ of the trough are secured to the upper portions of the members $k$ of the forward frame. The forward frame desirably inclines to the rear slightly and terminates just shortly below the trough, the members $k$ thereof being much shorter than the members $h$ of the frames $f$ and $g$, so that a considerable space intervenes between the forward frame $k$ $l$ and the ground while the devise is in its idle position; and inasmuch as the frame $h$ is located desirably substantially midway between the ends of the trough, though slightly nearer the forward end of the trough than the rear, it is apparent that when any portion of the body of the animal in moving forward has passed beyond the frame $h$, a forward turning effort is exerted upon the trough to the lower portion of the frame $h$ as a fulcrum, this turning effort being sufficient to depress the forward end of the trough when the head of the animal has reached the forward end of the trough, providing the animal be sufficiently heavy. If the animal is not heavy enough, what additional effort is needed to tilt the trough downwardly at its forward end may be furnished by an attendant. In order that the forward frame may be thoroughly braced, I provide inclined braces $n$, which, however, do not interfere with the tilting of the trough.

Inasmuch as the device of my invention is desirably useful in applying rings to the noses of animals, I prefer but partially to close the forward end of the trough, leaving at the forward end of the trough an opening through which the nose of the animal may project. In order that the animal within the trough may find egress at the forward end of the trough, I desirably provide a gate at the forward end of the trough, which gate is desirably mounted to swing outwardly and which gate is adjustable upon its mounting, so that the extent to which the meeting edge of the gate may approach a companion meeting edge, when closed, may be regulated, the space between these two meeting edges desirably constituting the opening through which the nose of the animal may project for the purpose of having a ring applied thereto. In the preferred embodiment of the invention, the gate is formed in two swinging members $o$ $o$ each mounted upon a pair of eye-bolts $p$ $p$ whose eyes encircle the hooks $q$ in the frame pieces $k$ $k$. The free ends of the eye-bolts $p$ are desirably threaded and are passed through nuts $r$ stationarily mounted in the swinging gate elements $o$ $o$. When it is desired to adjust the size of the space between the gate members $o$ $o$, the bolts $p$ are disengaged from the eyes $q$ and are turned within the nuts $r$ until the desired adjustment has been effected. After the desired adjustment has been secured, the nuts $s$ may be screwed home upon the bolts $p$ to make the mounting of the gate elements $o$ upon the bolts $p$ secure and firm.

I believe it to be new with me to provide means whereby a gate element may be adjustable upon its mounting, and I do not wish to be limited to the precise form of mounting illustrated. Inasmuch as I have employed swinging gates, I desirably employ as a means for holding the gates in a closed position, the locking bar $t$, which may simply be slipped within the hooks $u$ projecting from the frame pieces $k$.

It will be seen that by means of the device of my invention, a hog upon entering the trough will be inclined to continue its progress through the trough until it has passed sufficiently beyond the frame $h$ as to cause the trough to tilt forwardly upon the lower part of the frame $h$ as a fulcrum, whereupon the hog will be forced to pass its nose through the space between the locked and closed gate elements $o$ $o$, it being pre-supposed that the hog is to have a ring applied to its nose, in which case the gate elements $o$ $o$ are adjusted to leave a space between the same just sufficient to permit the nose of the hog to pass between said gate elements. The space between the closed gate elements $o$ $o$, obviously, may be adjusted to suit the size of the animal undergoing treatment, but frequent adjustment is not required, inasmuch as one space will accommodate the noses of all hogs but may have to be varied in order to reach the tusks or jaws of very large hogs, for the purpose of removing the long tusks. It is further apparent that by means of the apparatus of my invention the legs of the animals may be readily held for the purpose of castrating or spaying. It will be apparent that the shape of the bottom of the trough is such as to enable the animal to be easily turned and held upon its back when thrown by the operator, so that the operation of castrating and spaying may be more easily performed than hitherto.

While I have herein shown and particularly described the preferred embodiment of my invention, I do not wish to be limited to the precise construction shown, as modifications may readily be made without departing from the spirit of my invention, but,

Having thus described my invention, I claim as new and desire to secure by Letters Patent the following:—

1. An animal holder including united bottom and side walls adapted at one end to receive an animal, and provided with a gate structure at the other end to prevent or permit the exit of an animal, in combination with a mounting upon which the animal holder is adapted to rock in a direction to lower from its normal position the end of the holder having the gate structure, the mounting for the animal holder affording a stable support for the holder and being fixed with respect to the animal holder, the end of the animal holder having the gate structure projecting clear of the parts of said mounting, which are operative in the normal position of the holder whereby the animal, when occupying the latter end of the animal holder, exerts tilting action upon the animal holder.

2. An animal holder including united bottom and side walls adapted to receive an animal at one end and to discharge the animal at the other end, in combination with a mounting upon which the animal holder is adapted to rock in a direction to lower from its normal position the discharge end of the animal holder, said mounting for the animal holder affording a suitable support therefor and being fixed with respect thereto, the discharge end of the animal holder projecting clear of the parts of said mounting which are operative in the normal position of the holder, whereby the animal holder has tilting action exerted thereupon by the animal when leaving the holder.

3. An animal holder including united bottom and side walls adapted at one end to receive an animal, and provided with a gate structure at the other end to prevent or permit the exit of an animal, in combination with a mounting upon which the animal holder is adapted to rock in a direction to lower from its normal position the end of the holder having the gate structure, the mounting for the animal holder affording a stable support for the holder, the end of the animal holder having the gate structure projecting clear of the parts of said mounting which are operative in the normal position of the holder, whereby the animal, when occupying the latter end of the animal holder, exerts tilting action upon the animal holder.

In witness whereof, I hereunto subscribe my name this 8th day of February A. D., 1908.

THOMAS L. CARDWELL.

Witnesses:
L. G. STROH,
J. R. CARDWELL.